Patented Dec. 16, 1952

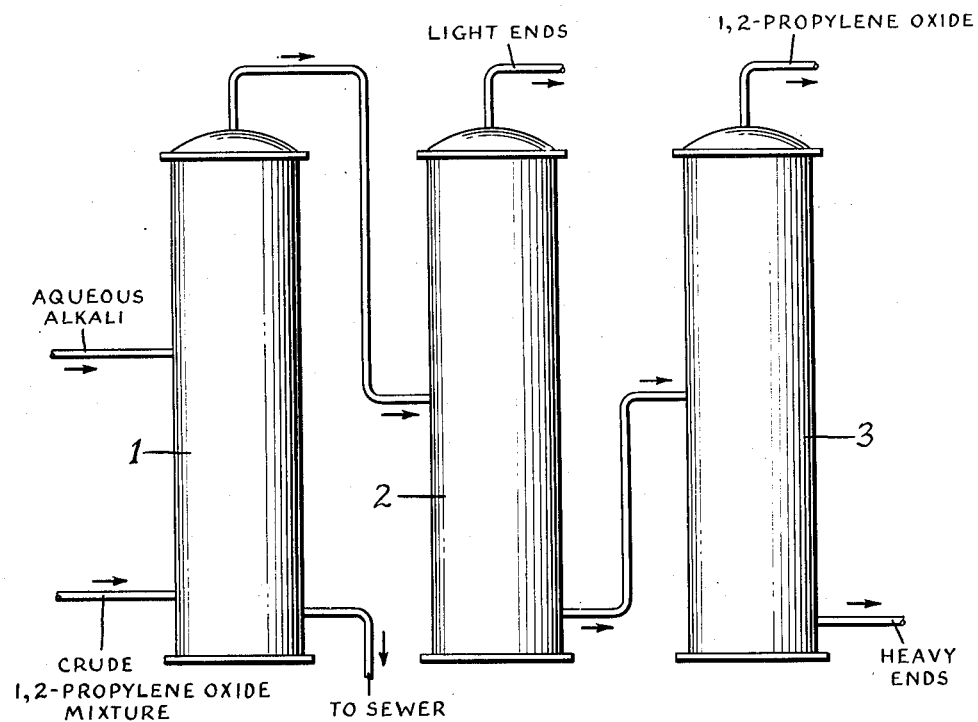

2,622,060

UNITED STATES PATENT OFFICE 2,622,060

PURIFICATION OF 1,2-PROPYLENE OXIDE

Max O. Robeson and Wallace E. Taylor, Corpus Christi, Tex., assignors to Celanese Corporation of America, New York, N. Y., a corporation of Delaware Application January 26, 1950, Serial No. 140,768

14 Claims. (Cl. 202—39.5)

This invention relates to a purification process and relates more particularly to an improved process for the production of purified 1,2-propylene oxide from crude mixtures of organic compounds containing 1,2-propylene oxide.

An object of this invention is the provision of an improved process for the separation, by distillation methods, of 1,2-propylene oxide free of methyl formate from a crude mixture of 1,2-propylene oxide containing methyl formate and other impurities such as acetaldehyde, methylal and methanol.

Another object of this invention is to provide an improved extractive distillation process for the separation of 1,2-propylene oxide in highly purified form from a crude fraction comprising essentially 1,2-propylene oxide which contains acetaldehyde, methyl formate, methylal and methanol as impurities.

Other objects of this invention will appear from the following detailed description.

The vapor phase, partial oxidation of aliphatic hydrocarbons such as propane or butane, or mixtures thereof, employing air or oxygen as the oxidizing agent, results in the production of a complex mixture of products including formaldehyde, acetaldehyde, methanol, propionaldehyde, allyl alcohol, isopropyl alcohol, n-propyl alcohol, isobutanol, secondary butanol, n-butanol, acetone, methyl ethyl ketone, methylal, acrolein, tetrahydrofuran, methyl formate and other esters, formals, acetals and various oxides, as well as numerous other aliphatic compounds, in varying amounts. In order to separate the complex mixture of oxidation products and to purify each of the components so that they will be suitable for commercial use, an intricate products purification scheme is necessary. The purification involves a series of operations yielding a number of crude fractions each containing a plurality of compounds. One such fraction obtained is a mixture comprising essentially 1,2-propylene oxide and containing acetaldehyde, methyl formate, methylal and methanol as impurities. The separation of 1,2-propylene oxide from this crude mixture by straight distillation methods is not a practical, commercial step because the relative volatility of the 1,2-propylene oxide and the methyl formate present in the crude mixture is near unity. Accordingly, the separation of 1,2-propylene oxide from the mixture in a highly purified form is not possible by ordinary fractional distillation.

We have now found that 1,2-propylene oxide may be separated in highly purified form from a crude mixture of 1,2-propylene oxide containing acetaldehyde, methyl formate, methylal and methanol as impurities by subjecting said mixture to an extractive distillation employing an aqueous solution of an alkaline compound as the extractant. During the extractive distillation, not only is the methyl formate saponified to methanol and an alkali metal formate but substantially all of the remaining impurities are separated from the 1,2-propylene oxide which is removed as the overhead product.

The extractant we employ preferably comprises a 5 to 12% by weight aqueous solution of the alkali. As examples of alkaline compounds, there may be mentioned sodium hydroxide, potassium hydroxide, sodium carbonate or sodium bicarbonate. By our novel process, 1,2-propylene oxide of a purity of 99% or more, and entirely free of methyl formate may be readily obtained. The process of our invention may be carried out either as a batch or as a continuous or semi-continuous operation.

In accordance with our novel process, for a continuous operation, the crude mixture of organic compounds containing 1,2-propylene oxide and methyl formate is continuously charged to a suitable fractionating column at a point somewhat below the middle plate of the column, while the aqueous alkali solution is continuously charged to the column at a point above the plate on which the crude organic feed enters. The fractionating column employed is provided with a reboiler and with suitable packing or, preferably, a plurality of bubble cap plates. The heat supplied to the reboiler coils is controlled so as to maintain the temperature of the vapors at the top of the column at from about 92 to 94° F. at one atmosphere pressure. The volume of aqueous alkali solution introduced into the column is adjusted so as to maintain a slight excess of alkali in the fractionating column relative to that theoretically necessary to saponify all of the methyl formate entering with the crude 1,2-propylene oxide feed. The excess of alkali in the column is preferably maintained at from about 2 to 10% in excess of that necessary for saponification of the methyl formate present. A reflux ratio of 10 to 1 is preferably maintained during the continuous extractive distillation when employing a column containing 30 theoretical plates.

The distillate from the column in our novel continuous extractive distillation comprises 1,2-propylene oxide of a purity of 95 to 97% by weight. Further purification may be effected if desired by fractionating this overhead product. The bottoms, comprising an aqueous mixture of alkali, sodium formate, methylal methanol and resins is continuously withdrawn from the reboiler and then discharged to the sewer since the organic content of the aqueous mixture obtained is usually too low to permit economical recovery.

The extractive distillation may also be effected as a batch process. When conducting the purification as a batch process, the batch of crude 1,2-propylene oxide feed to be purified is charged to the reboiler of a fractionating column and heat is then supplied thereto. When vaporization has commenced, the calculated amount of aqueous alkali extractant is gradually introduced at the top of the column. Extractive distillation takes place together with saponification of the methyl formate present. The initial product taken off overhead as the extractive distillation of the crude 1,2-propylene oxide takes place comprises the light ends which consist essentially of acetaldehyde. After removal of said light ends, i. e., everything boiling below about 93° F., purified 1,2-propylene glycol is then taken off overhead as the next fraction. The 1,2-propylene oxide fraction is condensed and is thus obtained in a purity of over 99.5% by weight.

The accompanying drawing shows diagrammatically the apparatus employed in the process of this invention.

In order further to illustrate our invention but without being limited thereto, the following examples are given:

*Example I*

500 parts by weight of a crude mixture containing approximately, by infra-red analysis, about 84% by weight of 1,2-propylene oxide, about 9% by weight of methyl formate, 5% by weight of methylal, 2.4% by weight of methanol, some acetaldehyde and traces of ethylene oxide are charged to the reboiler of a fractionating column. Heat is supplied to the reboiler and, when vaporization is started, about 315 parts by weight of a 10% aqueous solution of sodium hydroxide are gradually introduced at the top of the column. After all of the aqueous sodium hydroxide solution has been added, a cut boiling between 92–93° F. is taken overhead in an amount of 13 parts by weight. This cut comprises essentially 1,2-propylene oxide together with the acetaldehyde, the unsaponified methyl formate and the major part of the methanol, methylal and ethylene oxide initially present. A second cut boiling at 93–93.5° F. is then taken overhead in an amount of about 325 parts by weight. This cut comprises 1,2-propylene oxide of a purity of 99.6% by weight.

*Example II*

20 parts by weight per minute of the crude 1,2-propylene oxide mixture described in Example I is introduced at the 15th plate from the base of a 45 bubble plate fractionating column 1, shown in the accompanying drawing, while 13 parts by weight per minute of 10% aqueous sodium hydroxide are simultaneously introduced into said column 1 at the 30th plate above the base thereof. Heat is supplied to the column 2 by a steam coil in the reboiler. The temperature at the head of the column is maintained at 92–94° F. at one atmosphere and a reflux ratio of 10 to one is employed. The overhead product comprises 1,2-propylene oxide free of methyl formate and containing about 0.4% by weight of acetaldehyde, 2.0% by weight of methylal and 0.2% by weight of methanol. The still bottoms, comprising water, methanol, methylal, sodium formate and resins, are discarded. A side stream of the overhead product is continuously fed to a second fractionating column where the acetaldehyde is stripped off. The 1,2-propylene oxide removed from the base of the second fractionating column is further fractionated, and 1,2-propylene oxide of 99.5% purity is taken off overhead. The heavy ends consisting of methylal and methanol are removed from the base of the last column 3 and may be further purified or discarded.

It is to be understood that the foregoing detailed description is given merely by way of illustration and that many variations may be made therein without departing from the spirit of our invention.

Having described our invention, what we desire to secure by Letters Patent is:

1. In a process for the separation of 1,2-propylene oxide from a crude mixture of 1,2-propylene oxide containing methyl formate as an impurity, the step which comprises subjecting the crude 1,2-propylene oxide to an extractive distillation employing an aqueous solution of an inorganic saponifying agent as the extractant and removing purified 1,2-propylene oxide as the distillate.

2. In a process for the separation of 1,2-propylene oxide from a crude mixture of 1,2-propylene oxide containing methyl formate as an impurity, the step which comprises subjecting the crude 1,2-propylene oxide to an extractive distillation employing an aqueous solution of an alkali metal hydroxide as the extractant and removing purified 1,2-propylene oxide as the distillate.

3. In a process for the separation of 1,2-propylene oxide from a crude mixture of 1,2-propylene oxide containing methyl formate as an impurity, the step which comprises subjecting the crude 1,2-propylene oxide to an extractive distillation employing an aqueous solution containing 5 to 12% by weight of an alkali metal hydroxide as the extractant and removing purified 1,2-propylene oxide as the distillate.

4. In a process for the separation of 1,2-propylene oxide from a crude mixture of 1,2-propylene oxide containing methyl formate as an impurity, the step which comprises subjecting the crude 1,2-propylene oxide to an extractive distillation employing an aqueous solution containing 5 to 12% by weight of sodium hydroxide as the extractant and removing purified 1,2-propylene oxide as the distillate.

5. In a process for the separation of 1,2-propylene oxide from a crude mixture of 1,2-propylene oxide containing methyl formate as an impurity, the steps which comprise subjecting the crude 1,2-propylene oxide to an extractive distillation employing an aqueous solution of an inorganic saponifying agent as the extractant, then distilling off from the distillate any light ends present therein and finally distilling purified 1,2-propylene oxide from the remaining mixture.

6. In a process for the separation of 1,2-propylene oxide from a crude mixture of 1,2-propylene oxide containing methyl formate as an impurity, the steps which comprise subjecting the crude 1,2-propylene oxide to an extractive distillation employing an aqueous solution of an alkali metal hydroxide as the extractant, then distilling off from the distillate any light ends present therein and finally distilling purified 1,2-propylene oxide from the remaining mixture.

7. In a process for the separation of 1,2-propylene oxide from a crude mixture of 1,2-propylene oxide containing methyl formate as an impurity, the steps which comprise subjecting the crude 1,2-propylene oxide to an extractive distillation employing an aqueous solution containing 5 to 12% by weight of an alkali metal hydroxide as the extractant, then distilling off from the distillate any light ends present therein and finally distilling purified 1,2-propylene oxide from the remaining mixture.

8. In a process for the separation of 1,2-propylene oxide from a crude mixture of 1,2-propylene oxide containing methyl formate as an impurity, the steps which comprise subjecting the crude 1,2-propylene oxide to an extractive distillation employing an aqueous solution containing 5 to 12% by weight of sodium hydroxide as the extractant, then distilling off from the distillate any light ends present therein and finally distilling purified 1,2-propylene oxide from the remaining mixture.

9. Process for the separation of 1,2-propylene oxide from a crude mixture of 1,2-propylene oxide containing methyl formate, acetaldehyde, methylal and methanol as impurities which comprises subjecting the crude 1,2-propylene oxide to an extractive distillation with an aqueous solution of an inorganic saponifying agent, fractionally distilling the overhead product to remove acetaldehyde therefrom and distilling purified 1,2-propylene oxide from the residue of the fractional distillation.

10. Process for the separation of 1,2-propylene oxide from a crude mixture of 1,2-propylene oxide containing methyl formate, acetaldehyde, methylal and methanol as impurities, which comprises subjecting the crude 1,2-propylene oxide to an extractive distillation with an aqueous solution of an alkali metal hydroxide, fractionally distilling the overhead product to remove acetaldehyde therefrom and distilling purified 1,2-propylene oxide from the residue of the fractional distillation.

11. Process for the separation of 1,2-propylene oxide from a crude mixture of 1,2-propylene oxide containing methyl formate, acetaldehyde, methylal and methanol as impurities, which comprises subjecting the crude 1,2-propylene oxide to an extractive distillation with an aqueous solution containing 5 to 12% by weight of an alkali metal hydroxide, fractionally distilling the overhead product to remove acetaldehyde therefrom and distilling purified 1,2-propylene oxide from the residue of the fractional distillation.

12. Process for the separation of 1,2-propylene oxide from a crude mixture of 1,2-propylene oxide containing methyl formate, acetaldehyde, methylal and methanol as impurities, which comprises subjecting the crude 1,2-propylene oxide to an extractive distillation with 1.26 to 0.52 parts by weight of an aqueous solution, containing 5 to 12% by weight of an alkali metal hydroxide, for each part by weight of said crude 1,2-propylene oxide, fractionally distilling the overhead product to remove acetaldehyde therefrom and distilling purified 1,2-propylene oxide from the residue of the fractional distillation.

13. Process for the separation of 1,2-propylene oxide from a crude mixture of 1,2-propylene oxide containing methyl formate, acetaldehyde, methylal and methanol as impurities, which comprises subjecting the crude 1,2-propylene oxide to an extractive distillation with 1.26 to 0.52 parts by weight of an aqueous solution, containing 5 to 12% by weight of an alkali metal hydroxide, for each part by weight of said crude 1,2-metal hydroxide, for each part by weight of said crude 1,2-propylene oxide employing a reflux ratio of 10 to 1, fractionally distilling the overhead product to remove acetaldehyde therefrom and distilling purified 1,2-propylene oxide from the residue of the fractional distillation.

14. Process for the separation of 1,2-propylene oxide from a crude mixture of 1,2-propylene oxide containing methyl formate, acetaldehyde, methylal and methanol as impurities, which comprises subjecting the crude 1,2-propylene oxide to an extractive distillation with 1.26 to 0.52 parts by weight of an aqueous solution, containing 5 to 12% by weight of sodium hydroxide, for each part by weight of said crude 1,2-propylene oxide employing a reflux ratio of 10 to 1, fractionally distilling the overhead product to remove acetaldehyde therefrom and distilling purified 1,2-propylene oxide from the residue of the fractional distillation.

MAX O. ROBESON.
WALLACE E. TAYLOR.

REFERENCES CITED

The following references are of record in the file of this patent:

UNITED STATES PATENTS

| Number | Name | Date |
|---|---|---|
| 2,080,111 | Bump | May 11, 1937 |
| 2,290,636 | Deanesly | July 21, 1942 |
| 2,482,284 | Michael | Sept. 20, 1949 |
| 2,522,678 | Kozacik | Sept. 19, 1950 |
| 2,530,509 | Cook | Nov. 21, 1950 |
| 2,545,889 | MacLean | Mar. 20, 1951 |
| 2,550,847 | Mitchell et al. | May 1, 1951 |